US012662253B2

(12) United States Patent
Jang

(10) Patent No.: US 12,662,253 B2
(45) Date of Patent: Jun. 23, 2026

(54) BOOM GUIDANCE SYSTEM FOR AUTOMATED AIR-TO-AIR REFUELING

(71) Applicant: The Boeing Company, Arlington, VA (US)

(72) Inventor: Jung Soon Jang, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 34 days.

(21) Appl. No.: 18/631,445

(22) Filed: Apr. 10, 2024

(65) Prior Publication Data

US 2025/0319987 A1 Oct. 16, 2025

(51) Int. Cl.
| | |
|---|---|
| *B64D 39/00* | (2006.01) |
| *G05D 1/24* | (2024.01) |
| *G05D 1/461* | (2024.01) |
| *G06T 7/73* | (2017.01) |

(52) U.S. Cl.
CPC .............. B64D 39/00 (2013.01); G05D 1/24 (2024.01); G05D 1/461 (2024.01); G06T 7/75 (2017.01); *G06T 2207/10032* (2013.01)

(58) Field of Classification Search
CPC ........... B64D 39/00; G05D 1/24; G05D 1/461
See application file for complete search history.

(56) References Cited

U.S. PATENT DOCUMENTS

| | | | | | |
|---|---|---|---|---|---|
| 9,150,310 | B1 * | 10/2015 | Bray | ...................... | B64D 39/00 |
| 11,254,440 | B2 * | 2/2022 | Ropers | ...................... | G06T 7/70 |

| | | | | | |
|---|---|---|---|---|---|
| 2003/0209633 | A1 * | 11/2003 | Thal | ...................... | B64D 39/06 |
| | | | | | 244/135 A |
| 2004/0102876 | A1 * | 5/2004 | Doane | .................... | B64U 80/25 |
| | | | | | 701/9 |
| 2008/0250423 | A1 | 10/2008 | Bush et al. | | |
| 2011/0001011 | A1 | 1/2011 | Degiorgis et al. | | |
| 2018/0350104 | A1 | 12/2018 | Lozano | | |

(Continued)

FOREIGN PATENT DOCUMENTS

| | | | | | |
|---|---|---|---|---|---|
| CN | 107392963 A | * | 11/2017 | .............. | G06T 7/90 |
| EP | 3566949 B1 | | 4/2021 | | |
| WO | WO-2009101687 A1 | * | 8/2009 | ............. | G06T 7/593 |

OTHER PUBLICATIONS

WO-2009101687 Kawano (Year: 2009).*

(Continued)

*Primary Examiner* — Kito R Robinson
*Assistant Examiner* — Zachary E. F. Glade
(74) *Attorney, Agent, or Firm* — Harrity & Harrity, LLP

(57) ABSTRACT

A boom control system includes sensors that output sensor data indicative of a three-dimensional (3D) position of a receiver aircraft and a refueling boom in respective reference frames. An electronic control unit (ECU) reads a 3D model of the receiver from memory. The sensor data includes a 3D position of the receiver and boom in respective reference frames. The ECU maps points in the receiver reference frame to the boom reference frame as mapped points using the 3D model of the receiver and a linear model of the boom. The ECU computes Euclidian distances between each of the mapped points and each respective point on the boom, determines a minimum Euclidian distance, and executes a flight control operation of the boom in response to the minimum Euclidian radial distance being less than a threshold minimum distance.

20 Claims, 8 Drawing Sheets

(56)          References Cited

U.S. PATENT DOCUMENTS

2022/0108613 A1*   4/2022  Estep ................... B66F 9/0755
2023/0215041 A1     7/2023  Nguyen et al.

OTHER PUBLICATIONS

CN-107392963 Duan original and machine translation (Year: 2017).*
Extended European Search Report for European Application No. EP251636007 dated May 2, 2025, 5 pages.

* cited by examiner

A3R MISSION

1

BOOM GUIDANCE SYSTEM FOR AUTOMATED AIR-TO-AIR REFUELING

BACKGROUND

Air-to-air refueling is a process by which aviation fuel is offloaded from a fuel-supplying aircraft (tanker) to a fuel-receiving aircraft (receiver) while the tanker and receiver fly together in a close formation. Air-to-air refueling allows the receiver to remain airborne for extended periods of time or increase its flight range relative to traditional ground-based refueling options. During air-to-air refueling, aviation fuel is offloaded from the tanker to the receiver via an intervening conduit referred to as a refueling boom. A proximal end of the boom is pivotably mounted to the tanker at a point referred to as a boom pivot, while a distal end of the boom (boom tip) is operable for engaging a fuel receptacle on the receiver. The motion trajectory of the boom is typically controlled via a fly-by-wire process in response to manual or automated control inputs. Using a control station, for example, a team of boom operators may carefully align the boom tip with the receptacle via a control input while aircrew of the respective tanker and receiver minimize relative motion of the two aircraft. After achieving proper alignment, the boom tip securely engages the receptable. Aviation fuel is then transferred to the receiver through the boom.

Aboard a modern tanker, the aforementioned control station is typically located just aft of the tanker's cockpit. The refueling boom and the receiver are therefore outside of direct view of the boom operators. The boom operators are therefore assisted by a live video feed from a set of tanker-mounted cameras. Real-time image data of the boom and receiver may be projected onto one or more high-resolution display screens of the control station. In this manner, the boom operators are able to closely monitor the aerial refueling process. The same vision system capabilities allow some or all of the refuel process to be automated. In this case, the boom operators may have a reduced supervisory role aboard the tanker.

SUMMARY

The present disclosure relates to systems and methods for performing an aerial refueling process, in particular a boom-type automated air-to-air refueling (A3R) mission during which a refueling boom is used to offload aviation fuel from a fuel-supplying aircraft (tanker) to a fuel-receiving aircraft (receiver). In particular, the technical solutions described herein allow a computerized control station, possibly monitored or controlled by boom operators located onboard the tanker as noted above, to guide the boom through free space toward a fuel receptacle on the receiver. As part of the A3R mission, a boom guidance system as described below is configured to prevent the boom from contacting the receiver during a free flight. This goal is achieved using a geometric segmentation collision avoidance methodology as described herein.

In particular, a boom guidance system as disclosed herein includes a plurality sensors and an electronic control unit (ECU). The sensors are configured to output sensor data indicative of a three-dimensional (3D) position of the receiver and a refueling boom of the tanker in a receiver reference frame and a boom reference frame, respectively. The ECU, which is in communication with the sensors, is programmed to read a 3D model of the receiver from memory of the ECU and receive the sensor data, including a position of the receiver in the receiver reference frame and a pitch, roll, and telescope length of the boom in the boom reference frame.

The ECU in this embodiment is also programmed to map a set of points in the receiver reference frame to the boom reference frame as mapped points using the 3D model of the receiver and a linear model of the boom and compute Euclidian radial distances between each of the mapped points and each respective point on the boom. Additionally, the ECU determines a minimum Euclidian radial distance in the set of Euclidian distances and executes a flight control operation of the boom in response to the minimum Euclidian radial distance being less than a threshold minimum distance.

An embodiment of a method for controlling the A3R mission includes reading a 3D model of the receiver from memory of the ECU, and receiving sensor data from the sensors via the ECU. The sensor data is indicative of a 3D position of the receiver and a 3D position of the boom in the receiver and boom reference frames, respectively, with the sensor data including pitch, roll, and telescope length of the boom in the boom reference frame. Additionally, the method includes mapping a set of points in the receiver reference frame to the boom reference frame as mapped points using the 3D model of the receiver and a linear model of the boom, computing Euclidian radial distances between each of the mapped points and each respective point on the boom, and determining a minimum Euclidian radial distance in the set of Euclidian distances. As part of the method, the ECU also executes a flight control operation of the boom via the ECU in response to the minimum Euclidian radial distance being less than a threshold minimum distance.

The above summary is not intended to represent every possible embodiment or every aspect of the present disclosure. Rather, the foregoing summary is intended to exemplify some of the novel aspects and features disclosed herein. The features, functions, and advantages of the present disclosure can be achieved independently in various embodiments or may be combined in other embodiments, further details of which may be seen with reference to the following detailed description and accompanying drawings.

Figure 1:
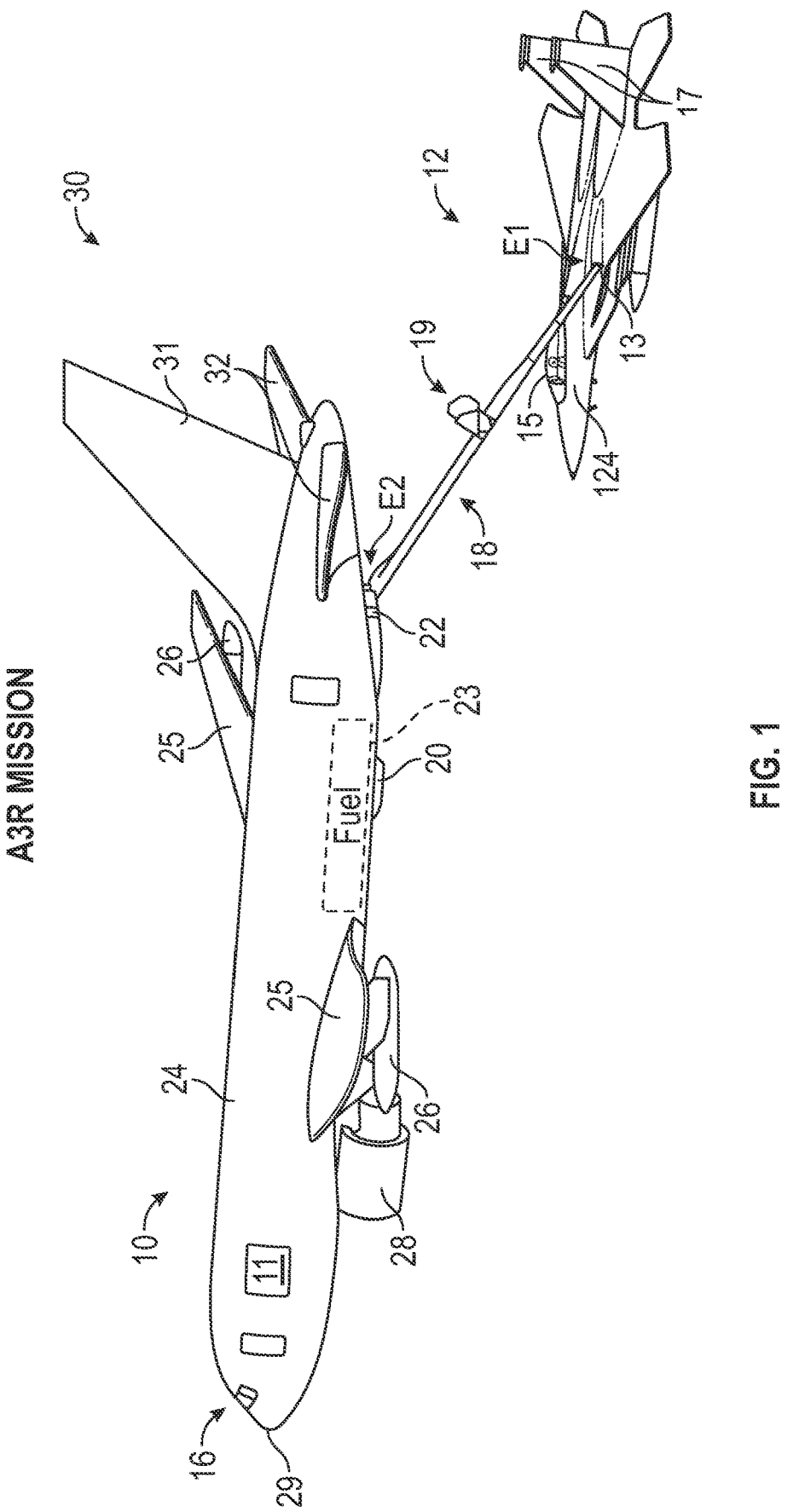
FIG. 1 illustrates a representative automated air-to-air (A3R) refueling mission during which a fuel-supplying aircraft (tanker) delivers aviation fuel to a fuel-receiving aircraft (receiver) through a refueling boom with the assistance of a geometric segmentation collision avoidance method as described herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. It is to be understood, however, that the disclosed embodiments are illustrative examples, and that other embodiments can take various and alternative forms. The Figures are not necessarily drawn to scale and may be schematic. Some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to the drawings wherein like reference numbers refer to the same or like components in the several Figures, and beginning with FIG. 1, a fuel-supplying aircraft (tanker) 10 and a fuel-receiving aircraft (receiver) 12 are shown engaged in a representative automated air-to-air refueling (A3R) mission. As part of this effort, a boom guidance system 11 is programmed to prevent contact or collision of a refueling boom 18 and the receiver 12 as the boom 18 trails behind the tanker 10 during the A3R mission. Collision avoidance is provided herein by performance of a method 100M, a non-limiting example embodiment of which is described below with reference to FIG. 3, with execution of the method 100M used to augment an existing flight control methodology when controlling flight of the boom 18.

With respect to the representative tanker 10 of FIG. 1, this aircraft includes a fuselage 24 connected to one or more wings 25. In the illustrated configuration, the fuselage 24 is configured to transport aviation fuel 23. To that end, the fuselage 24 may define a cargo bay with one or more fuel tanks (not shown) holding the aviation fuel 23 for ultimate delivery to the receiver 12 while the tanker 10 and receiver 12 are in flight. Each wing 25 may be connected in some configurations to a refueling pod 26 and one or more engines 28, e.g., jet turbines, with the engines 28 collectively providing sufficient thrust for propelling the tanker 10. The tanker 10 in one or more configurations could also deploy flexible drogues (not shown), with each drogue fluidly coupled to the refueling pods 26 or to the fuselage 24. The fuselage 24 also defines the cockpit 16 proximate a nose 29 of the tanker 10. At the opposite end of the tanker 10, an empennage assembly 30 is connected to the fuselage 24, with an empennage assembly 30 in the representative construction of FIG. 1 including a vertical stabilizer 31 and horizontal stabilizers 32.

The tanker 10 of FIG. 1 is equipped to perform an aerial refueling operation of the type contemplated herein. To that end, the tanker 10 may be embodied as a structurally-modified commercial passenger or transport aircraft having a reinforced airframe suitable for securely transporting the above-noted aviation fuel and associated fuel tanks, and equipped with mission-suitable avionics and control systems. Such modifications collectively enable the tanker 10 to transport aviation fuel to a predetermined rendezvous site with the receiver 12. Upon reaching the rendezvous site, the tanker 10 flies in close formation with the receiver 12, the particular configuration of which may differ from that which is depicted in FIG. 1 and may be automatically identified in some embodiments using the boom guidance system 11.

Figure 2:
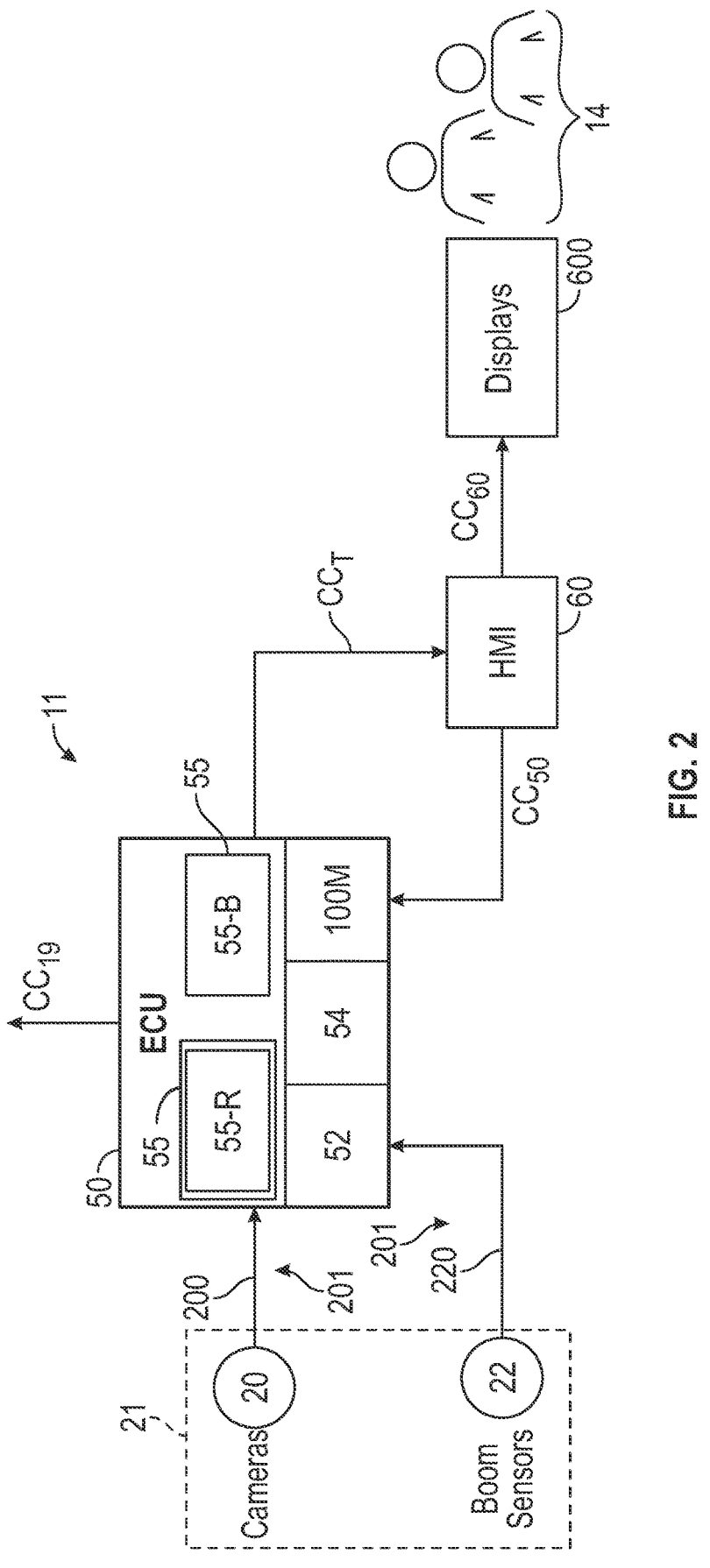
FIG. 2 is a schematic flow diagram of an exemplary boom guidance system operable for controlling the boom of FIG. 1 during the A3R mission in accordance with the present method.

Referring briefly to FIG. 2, the boom guidance system 11 in one or more implementations includes an electronic control unit (ECU) 50, which may be programmed for determining an identity of the receiver 12. The ECU 50 may identify the receiver 12 in flight, e.g., using machine learning or vision capabilities informed by real-time sensor data 201 from a plurality of sensors 21. For example, the sensor data 201 may include real-time image data 200 from one or more tanker-mounted cameras 20, with such cameras 20 being included in the above-noted sensors 21. The ECU 50 includes a tangible, non-transitory storage medium (memory) 52 on which is recorded a three-dimensional (3D) model of the receiver 12, shown schematically as a receiver model 55-R. For instance, the ECU 50 may process the image data 200 to automatically identify the receiver 12 as being a particular type or model of aircraft, and thereafter access its memory 52 to select the correct receiver model 55-R from a library 55 of different receiver models 55-R. That is, the tanker 10 may be used to refuel a number of suitably-equipped receivers 12, such as but not limited to cargo planes, other tankers, surveillance and/or reconnaissance aircraft, air traffic control aircraft, weather monitoring aircraft, etc. The depicted construction of the receiver 12 of FIG. 1 is therefore illustrative of just one possible embodiment thereof.

The boom 18, a proximal end (pivot) E2 of which is connected to the fuselage 24 of the tanker 10 as shown in FIG. 1, moves within the slipstream of the tanker 10 with a level of flight control afforded by boom flight control surfaces 19 as appreciated in the art. The boom 18 is a telescoping device, and thus has a variable length relative to the boom pivot E2. One or more of the cameras 20 are securely mounted to the tanker 10 on or near the boom pivot E2 to enable accurate visualization of the receiver 12 and the boom 18 during the A3R mission.

Flight control signals ($CC_{19}$) operate as actuator commands to the control surfaces 19 during flight control operations of the boom 18, and are typically transmitted by-wire from operator inputs from one or more boom operators 14, with the end result being the guidance of a distal end/boom tip E1 of the boom 18 into mating engagement with a fuel-receiving receptacle 13 located on the receiver 12. In the non-limiting embodiment of FIG. 1, for instance, the receptacle 13 is located on a fuselage 124 of the receiver 12 just aft of and adjacent to a canopy 15, and well forward of a set of vertical stabilizers 17. However, the actual location of the receptacle 13 on a given receiver 12 will vary with the particular construction of the receiver 12, and therefore the embodiment of FIG. 1 illustrates just one possible location.

As set forth in detail below, the method 100M performed by the ECU 50 of FIG. 2 utilizes the receiver model 55-R and a boom model 55-B, along with predetermined kinematics of the boom 18 as described below, to predict a boundary condition at which the boom 18 and the receiver 12 might closely approach each other or intersect. When this boundary condition occurs, the ECU 50 may selectively the augment the flight control signals ($CC_{19}$) to the boom 18 to help steer clear of the boundary condition. Augmentation of the flight control signals ($CC_{19}$) in this manner executing flight control operation of the boom 18 by transmitting the flight control signals ($CC_{19}$) in modified form to one or more flight control surfaces on the refueling boom 18 at or near the boundary condition, while at the same time ensuring that the selective augmentation does not interfere with primary tracking and boom-receptacle contact performance performed in accordance with the fight control signals ($CC_{19}$) prior to their augmentation.

The boom operators 14 illustrated in FIG. 2, i.e., trained personnel/aircrew trained to supervise and possibly perform portions of the disclosed aerial refueling tasks as needed, may be situated aboard the tanker 10 of FIG. 1, typically in proximity to/aft of a cockpit 16 thereof. The boom operators 14 may closely supervise and possibly control motion of the boom 18 during the A3R mission depicted in FIG. 1. When performing this task, the boom operators 14 and the ECU 50 of FIG. 2 are assisted in visualizing the receiver 12 and the boom 18 by the cameras 20, with the collected image data 200 from the cameras 20 being communicated to the ECU 50. Each camera 20 may be optionally embodied as rearward-facing monocular, or stereo cameras of an application-specific spectral capability, configured to output real-time image data as part of the real-time sensor data 201. For example, the camera(s) 20 could be configured to collect the real-time image data 200 in a human-visible/red-green-blue (RGB) spectral range, or using near-infrared (near-IR), infrared (IR), or other portions of the electromagnetic spectrum.

The ECU 50 shown in FIG. 2 is also in communication with one or more boom sensors 22, e.g., rotary encoders and linear position sensors, to receive boom position data 220 descriptive of the current position, attitude, and telescope position/length of the boom 18 in free space as the boom 18 trails behind the tanker 10. As appreciated in the art, the boom 18 is pivotably mounted to the fuselage 24 of the tanker at the location of the boom pivot E2 of FIG. 1, itself a motorized pivoting and rotating (revolute) joint allowing the boom 18 to be flown to a commanded position in free space. The boom 18 is also configured to extend toward the receiver 12 and retract toward the tanker 10, and thus is constructed as a telescoping device. Thus, the length or telescope position of the boom 18 is another positional value used herein by the ECU 50 in the overall control of the boom 18.

During the A3R mission illustrated in FIG. 1, the ECU 50 of FIG. 2 is used to help guide the boom tip E1 toward and into mating engagement with the receptacle 13 located on the receiver 12, while at the same avoiding any obstacles in the path of the boom 18. Such obstacles could include intervening surfaces or structural features of the receiver 12 possibly located in a line-of-sight with the boom tip E1, e.g., the canopy 15, the vertical stabilizer(s) 17, the fuselage 124, or an antenna (not shown) or other protruding surfaces of the receiver 12.

Within the scope of the present disclosure, the image data 200 from the cameras 20 is used by the ECU 50 to determine a position of the receiver 12 and the receptacle 13 when controlling motion of the boom 18. The boom operators 14 and the ECU 50, informed by the image data 200 and the boom position data 220, then impart or request that electronic control signals ($CC_{50}$) be communicated to the ECU 50, for instance autonomously or possibly using a humanmachine interface (HMI) device 60 that is in wired or wireless communication with the ECU 50. The HMI device 60 of FIG. 2 in one or more embodiments could include, by way of example and not of limitation, one or more high-resolution display screens (Displays) 600 controllable via display input signals ($CC_{60}$), e.g., touch-sensitive screens, as well as keyboards, joysticks, dials, etc. In one or more embodiments, the ECU 50 may transmit a trajectory display signal (CCT) to the HMI 60 to cause the HMI 60 to present a 2D or 3D representation of trajectory lines (not shown) to the boom operators 14 via the displays 600.

Ultimately, the electronic control signals ($CC_{50}$) cause the ECU 50, using its memory 52 and one or more processors 54, to electronically control a corresponding attitude of the flight control surfaces 19 of the boom 18 by transmitting the flight control signals ($CC_{19}$). In other words, the boom 18 is controllable in a fly-by-wire manner in one or more implementations, such that there is no physical control link between the boom operators 14 and the boom 18. Other control implementations may be envisioned within the scope of the disclosure, including semi-autonomous or fully-autonomous control implementations, and therefore the present solutions are not limited to crewed aerial refueling operations as described herein.

Figure 3:
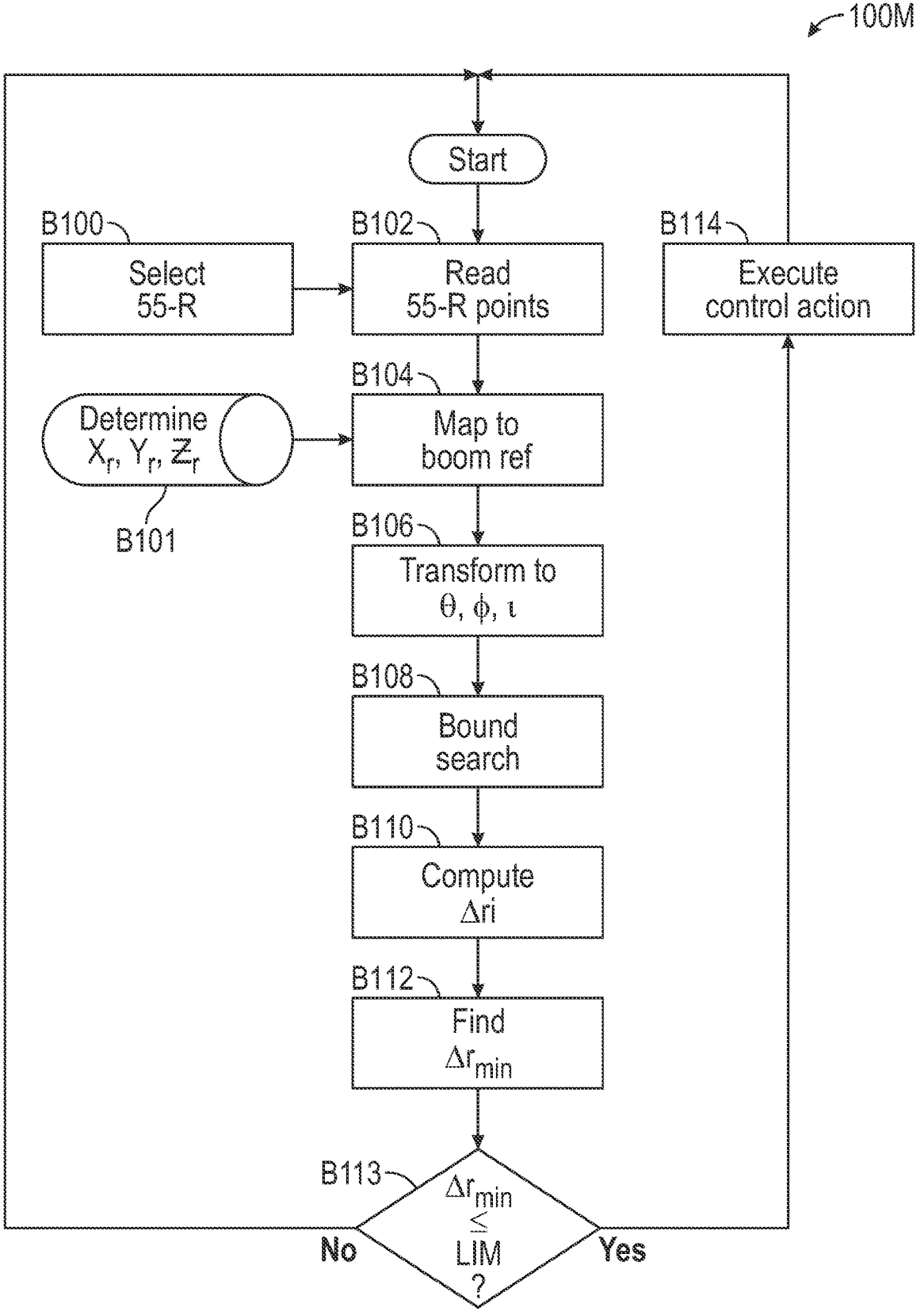
FIG. 3 is a flow chart describing an exemplary embodiment of the present method.

The ECU 50 of FIG. 2 may be embodied as one or more computer systems configured to execute computer-readable instructions embodying the method 100M of FIG. 3. As contemplated herein, the processor(s) 54 may be implemented as a microcontroller, one or more Application Specific Integrated Circuit(s) (ASICs), Field-Programmable Gate Array (FPGAs), electronic circuits, central processing units (CPUs), etc. The memory 52 in turn includes associated transitory and non-transitory memory/computer storage media, e.g., read only memory, programmable read only memory, solid-state memory, random access memory, optical and/or magnetic memory, etc. Computer-readable instructions embodying the method 100M may be recorded in memory 52 and executed by the processor(s) 54 as machine-readable code/instructions, software, and/or firmware programs. Other hardware components of the schematically-depicted ECU 50 are omitted for simplicity but are well understood in the art, such as combinational logic circuits, input/output (I/O) circuits, digital and analog signal conditioning/buffer circuitry, and other hardware components that may be accessed as needed by the processor(s) 54 to provide the control functionality described herein. Execution of the method 100M requires access to and use of the boom model 55-B and receiver model 55-R, each of which will now be described with continued reference to FIGS. 1 and 2.

Boom Model: the boom model 55-B as contemplated herein may be implemented as a straight-line segment extending between two endpoints, i.e., the boom tip E1 and the boom pivot E2 of FIG. 1. The boom model 55-B includes every point on a line between the boom tip E1 and the boom pivot E2. The predetermined kinematics of the boom 18, which may also be considered as part of the boom model 55-B, are used by the ECU 50 to determine how the boom 18 is free to move in free space and describe where the boom tip E1 is with respect to the boom pivot E2. Such information also provides the ECU 50 with a way to convert points on the "E2-to-E1" line segment between two different coordinate systems, i.e., a coordinate system of the boom 18 aboard the tanker 10 and a coordinate system of the receiver 12 as initially represented in its own frame of reference.

As set forth below, a linear transformation is performed by the ECU 50 of FIG. 2 to convert points on the boom 18 based on the boom data 220 (i.e., pitch, roll, and telescope position), to corresponding 3D positions taken with respect to nominal Cartesian axes (X, Y, Z) from the perspective of the boom pivot E2. Use of the boom model 55-B also enables the reverse conversion of points on the Cartesian axes from the boom pivot E2 to the pitch, roll, and telescope length information. Such position transformation enables two dissimilar sensor measurements for the boom 18 and the receiver 12 to have a common representation and thereby facilitate the geometric operations that follow as part of the method 100M.

Receiver Model: the receiver model 55-R of FIG. 2 as contemplated consists of a set of points that collectively represent a surface geometry of the receiver 12, e.g., abstracted from a 3D CAD model. The receiver model 55-R may describe an unstructured triangulated (or tetrahedral) surface using a wire mesh model formed of multiple tri- angles (or tetrahedra) to represent the boundary of a 3D geometry of the receiver 12. This representation is in a 3D Cartesian reference frame, the latter having its origin [0, 0, 0] at the receptacle 13. Once a machine learning-based vision system informed by the cameras 20 of FIG. 1 detects the 3D position of the receptacle 13 relative to the Cartesian axes, a simple linear transformation may be used by the ECU 50 of FIG. 2 to map the 3D points on the surface of the receiver 12 (e.g., [points on the individual vertices of the above-noted triangles of the 3D mesh) to the boom pivot E2.

Referring now to FIG. 3, an exemplary embodiment of the method 100M is described as a series of process steps or blocks for illustrative clarity. Each block may be performed by the ECU 50 of FIG. 2 in the course of an A3R mission to situationally augment a flight control sequence of the boom 18 depicted in FIG. 1. As part of the method 100M, the ECU 50 receives sensor data 201, including the image data 200 and the boom position data 220 of FIG. 2, from the respective cameras and boom sensors 20 and 22, with the sensor data 201 being indicative of a 3D position of the receiver 12 and boom 18 in a receiver reference frame and a boom reference frame, respectively.

Upon start, such as at the onset of the A3R mission, the receiver model 55-R is selected at block B100 ("Select 55-R"). The receiver model 55-R may be loaded prior to or at the onset of the A3R mission when the identity of the receiver 12 is known beforehand. In some implementations, the library 55 may be stored in the memory 52 of the ECU 50 shown in FIG. 2, with the library 55 possibly populated with multiple different version of the receiver model 55-R. For instance, the library 55 may include different types of receivers 12 each possibly having a different geometry and size, with each possibly having a different location for a corresponding receptacle 13. The boom operators 14 of FIG. 2 could also manually select the appropriate receiver model 55-R from such a library 55, e.g., via the HMI 60, or the receiver model 55-R may be automatically selected by the ECU 50 in response to a flight plan or other criteria.

Alternatively, the ECU 50 may be programmed to identify the receiver 12 during the A3R mission and thereafter select the receiver model 55-R from the library 55 based on an identity of the receiver 12. For example, the ECU 50 may be configured to identify the receiver 12 during the A3R mission by recognizing the receiver 12 in the real-time image data 200, for instance by matching the detected receiver 12 to a corresponding receiver model 55-R using a neural network or other trained vision system software as appreciated in the art. The method 100M then proceeds to block B102.

Block B101 ("Determine X$_r$, Y$_r$, Z$_r$") entails determining Cartesian positions of the receptacle 13, i.e., [Xr, Yr, Zr], as corresponding positions of the receptacle 13 on the 3D CAD-modeled surface of the receiver 12. This task may be accomplished using a suitably configured vision system and the cameras 20 as appreciated in the art, or using a machine learning technique.

At block B102 ("Read 55-R Points"), the ECU 50 reads the 3D model of the receiver, i.e., 55-R, from its memory 52. To this end, the ECU 50 reads the relevant points from the receiver model 55-R of block B100 into its memory 52 via the processor 54 of FIG. 2, with the points being the [X, Y, Z] points describing the outer envelope of receiver 12. Such points are taken relative to the receptacle 13, i.e., the receptacle 13 coincides with the origin. To reduce the computational load of the ECU 50, a subset of the collective set of points of the receiver model 55-R may be read into memory 52. That is, a MATLAB® script could be run that includes points on the surface of the receiver 12 encom- passing only the nose of the receiver 13 to just aft of the receptacle 13, thus excluding all other points on the receiver 12. This reduction in considered points is possible because control law used to operate the boom 18 does not permit the boom tip E1 (FIG. 1) from passing the receptacle 13, thus rendering the processing of points aft of the receptacle 13 unnecessary.

Figure 4:
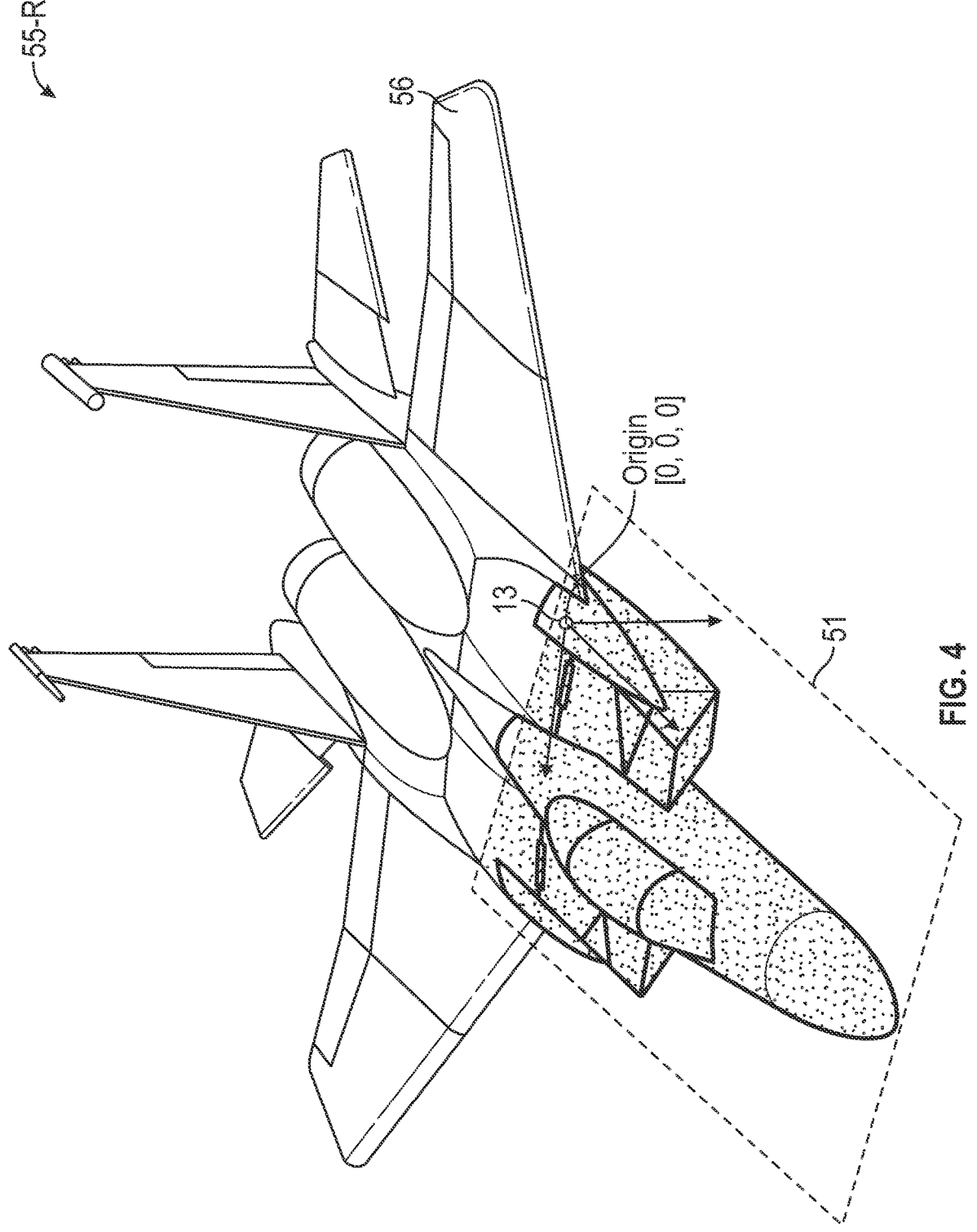
FIG. 4 is an illustration of a representative three-dimensional (3D) receiver model usable as part of the present method in which a limited search area is established relative to a location of a receptacle of the modeled receiver.

Referring briefly to FIG. 4, an example of the receiver model 55-R is illustrated as 3D CAD wire mesh 56 formed by interconnecting points at cell vertices or corners, depend- ing on the shape of the mesh cells. As noted above, the origin [0, 0, 0] is the position of the receptacle 13. Search area 51 contains the reduced set of points noted above, i.e., the points in the 3D CAD model located forward of the recep- tacle 13. For illustrative clarity, such points are shown in the search area 51 of FIG. 4 alone, but would be included at all areas of the receiver 12. In other words, the receiver model 55-R is constructed of 3D points as opposed to lines, as appreciated in the art. Thus, at block B102 of FIG. 3, the ECU 50 of FIG. 2 has not yet ascertained how the receptacle 13 relates to the frame of reference of the boom pivot E2 (FIG. 1), but rather how the receptacle 13 located at the origin [0, 0, 0] is positioned relative to all remaining points of the receiver model 55-R. The method 100M thereafter proceeds to block B104.

The ECU 50 is programmed to execute the method 100M in part by mapping a set of points in the receiver reference frame to the boom reference frame, as mapped points, using the 3D model of the receiver 12, i.e., 55-R, and a linear model of the boom 18, i.e., 55-B.

At block B104 ("Map to Boom Ref"), the ECU 50 next performs a straightforward linear transformation to map the 3D points from the original reference frame of FIG. 4, i.e., the modeled 3D surface of the receiver 12, to the reference frame of the boom pivot E2. This can be accomplished using the Cartesian positions of the receptacle 13, i.e., [Xr, Yr, Zr]. That is, the origin at the receptacle 13 is transformed from [0, 0, 0] in the reference frame of the receiver 12 to points [X$_i$, Y$_i$, Z$_i$] in the reference frame of the boom pivot E2. The method 100M thereafter proceeds to block B106.

Figure 5:
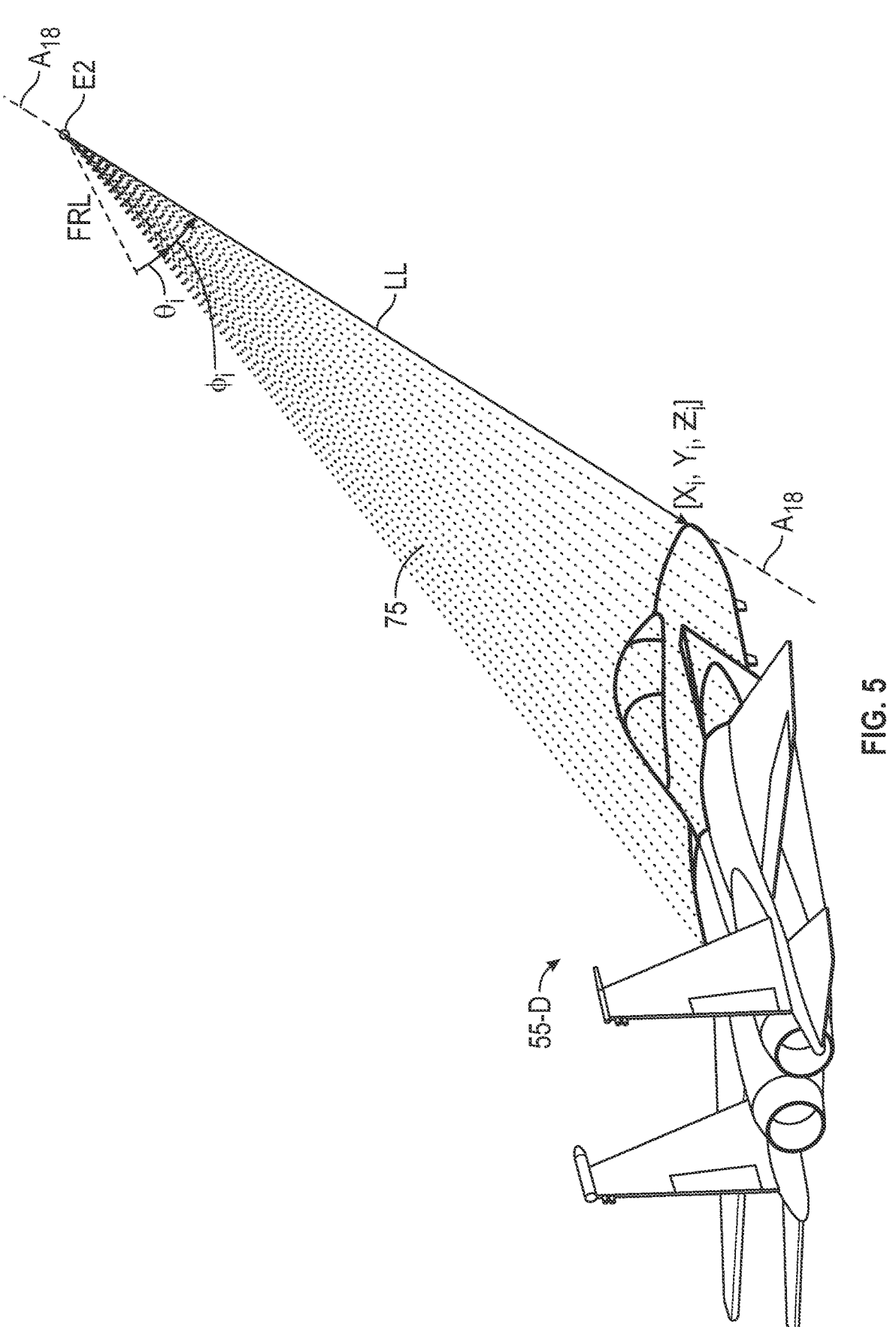
FIG. 5 illustrates the representative receiver model of FIG. 4 as applied when performing a coordinate transformation process.

Block B106 ("Transform to θ, φ, l") includes performing a position transformation to convert the 3D points [X$_i$, Y$_i$, Z$_i$] from the Cartesian axes of block B104 to a coordinate system of the boom 18, i.e., pitch (θ$_i$), roll (φ$_i$), and telescope (l$_i$). This may be achieved using the above-noted predeter- mined kinematics model 75 of the boom 18 as appreciated in the art and illustrated in FIG. 5. As shown in FIG. 5, for instance, the kinematics model 75 mathematically describes the possible range of motion of the boom 18, i.e., by defining precisely how the boom 18 is able to move relative to its boom pivot E2. Using the kinematics model 75, the ECU 50 is able to determine the location of the boom tip E1 in free space along a length (LL) of the boom 18, i.e., along the boom axis $A_{18}$ as shown in FIG. 7B. The ECU 50 can therefore determine the nearest point on the receiver 12 to the boom axis $A_{18}$ along its entire length (LL), such that the transformation of block B106 is made possible. The method 100M thereafter proceeds to block B108.

Still referring to FIG. 3, block B108 ("Bound Search") entails bounding the search region. This has the benefit of reducing the computational load of the ECU 50. The position of the boom 18 may be determined in real-time via the boom sensors 22 of FIG. 1 as noted above, and thus is available to the ECU 50 for this calculation. Another available quantity is the speed at which the boom 18 is able to move through free space in a given time step, e.g., 30-50 milliseconds. Thus, by using block B108 as part of the method 100M, the ECU 50 of FIG. 2 need not search on unattainable points located outside of the potential range of motion of the boom 18 over the defined time step.

Figure 6:
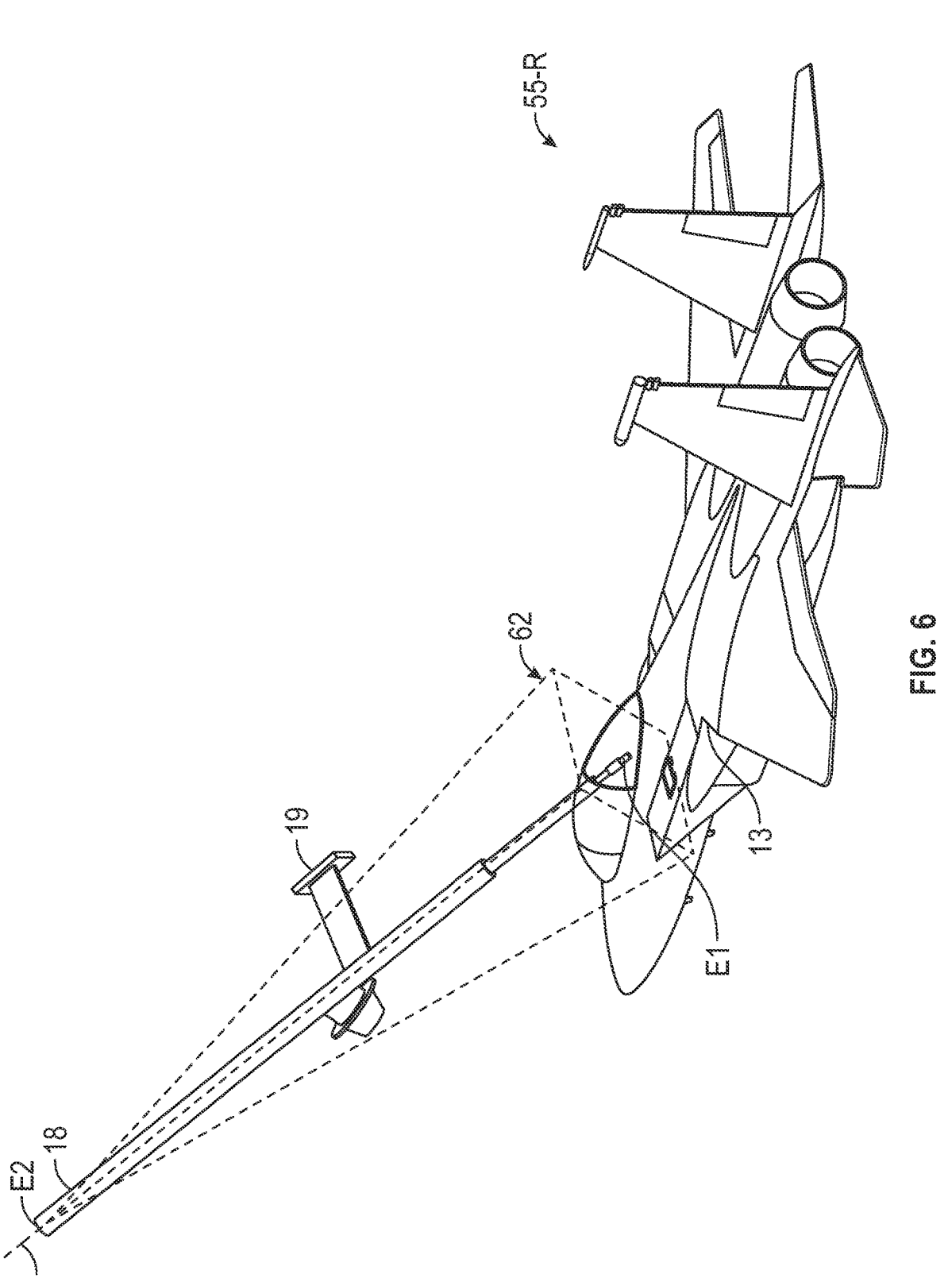
FIG. 6 is a perspective view illustration of the receiver model of FIGS. 4 and 5 depicting a bounding box that provides a reduced search region relative to the boom.

As with the defined search area 51 of FIG. 4, in other words, the method 100M disregards superfluous data points to conserve computational resources and expedite its calculations. Reducing the number of points on the surface of the receiver 12 to be searched for potential intersection or proximity with the boom 18 may be achieved by placing a bounding box 62 around the current boom position, as illustrated in FIG. 6. That is, the ECU 50 may be programmed to create the bounding box 62 around a current position of the boom 18, with the volume of the bounding box 62 being based on a predetermined speed of movement of the boom 18, and to compute the set of Euclidian radial distances $(\Delta r_i)$ as set forth below only for points located within the volume of the bounding box 62.

The following assumption is valid as long as a volume of the bounding box 62 is sufficiently large for encompassing the boom tip E1, boom pivot E2, and all of the points within the defined area 51 (FIG. 4):

$$\theta_{boom} - \Delta\theta \le \theta_i \le \theta_{boom} + \Delta\theta$$

$$\phi_{boom} - \Delta\phi \le \phi_i \le \phi_{boom} + \Delta\phi$$

$$l_{tel_i} \le l_{boom}$$

Note that $(\theta_{boom}, \phi_{boom}, l_{boom})$, i.e., pitch, roll, and telescope length of the boom 18, respectively, together represent the current position of the boom 18, and $(\theta_i, \phi_i, l_{tel_i})$ are a collection of points on the receiver 12 within a volume defined by $(\Delta\theta, \Delta\phi, l_{boom})$. The default values of $\Delta\theta$ and $\Delta\phi$ are 5.0° and 10.0°, respectively, in a representative implementation. The method 100M proceeds to block B110 after the bounding box 62 has been set.

At block B110 ("Compute $\Delta r_i$") of FIG. 3, the ECU 50 next computes the set of Euclidian radial distances $\Delta r_i$ between each of the mapped points and each respective point on the boom 18, in this case the projected boom tip E1 and the 3D points on the receiver 12 located within the bounding box 62 of FIG. 6. As shown in FIG. 7B, the projected boom tip E1, i.e., at $[\Theta_b, \Psi_b, l_{r_i}]$, is on an elevation and azimuth plane 70 that is oriented perpendicular to a telescope axis $A_{18}$ of the boom 18. Here, $\Theta$ and $\Psi$ respectively represent the elevation angle and azimuth angle. $I_{r_i}$ represents a Euclidian distance of the boom tip E1 to the $i^{th}$ 3D point on the receiver 12. The above-noted plane 70 includes the projected boom tip E1 and the 3D points on the receiver 12, i.e., $[\Theta_{r_i}, \Psi_{r_i}, I_{r_i}]$, in the telescope direction. The method 100M therefore involves effectively moving the plane 70 along the boom axis $A_{18}$ in the direction of arrow AA and considering any encountered points on the receiver 12.

As appreciated in the art, the elevation and azimuth angles may be calculated as follows:

$$\Theta = \arcsin\left[\cos\theta_B \cdot \sin\theta_I + \sin\theta_B \cdot \cos\theta_I \cdot \cos\phi\right]$$

$$\Psi = \arcsin\left[\frac{-\sin\theta_B \cdot \sin\phi}{\sin\theta_B \cdot \cos\phi \cdot \sin\theta_I - \cos\theta_B \cdot \cos\theta_I}\right]$$

where $\theta_I$ is the roll tilt angle, or about −5.0° in a possible implementation, and $\theta_B$ is the elevation angle.

Figure 7A:
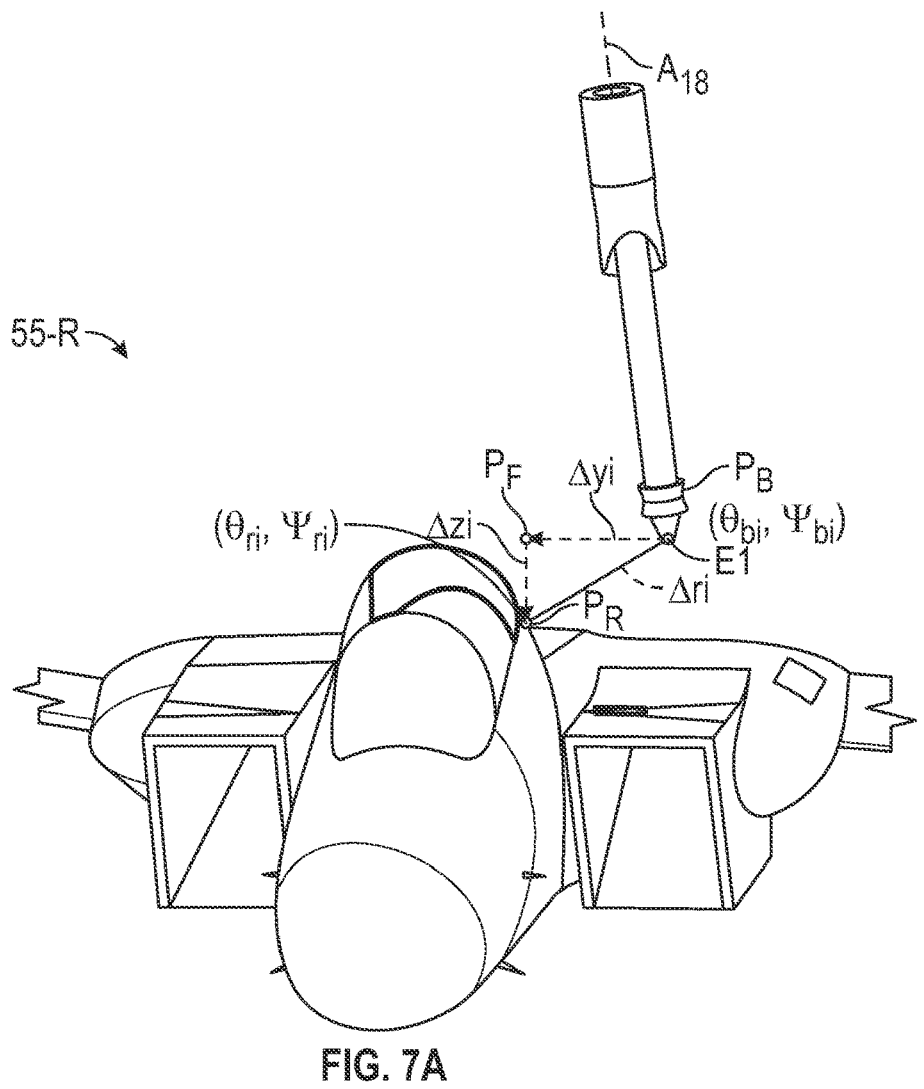
FIGS. 7A and 7B illustrate a portion of the receiver model in conjunction with computation of Euclidian radial distances.
Figure 7B:
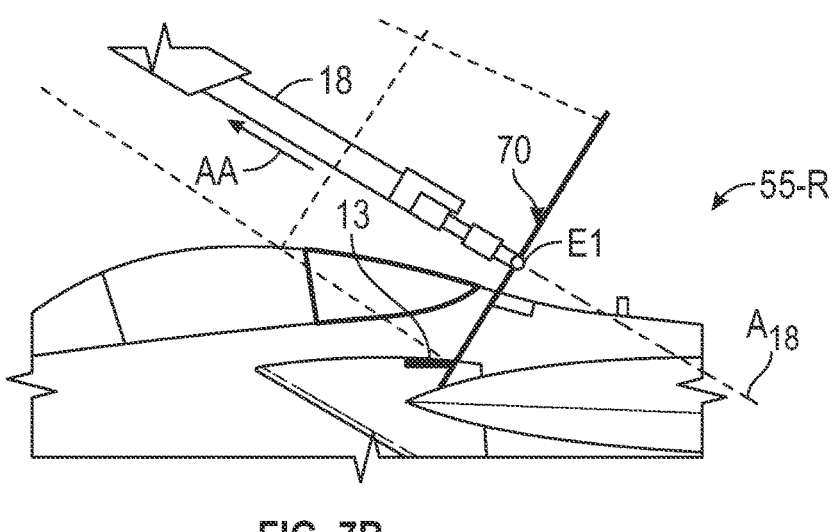

The result of block B110, i.e., $\Delta r_i$, is illustrated for a representative point $P_R$ on the receiver 12 of FIG. 7A as the hypotenuse of a right triangle formed between the boom tip E1, i.e., point $P_B=(\theta_{B_i}, \Psi_{B_i})$, and a point $P_R$ on the receiver 12, i.e., $P_R=(\theta_{r_i}, \Psi_{r_i})$, and a point $P_F$ in free space. The right triangle is thus formed with sides $\Delta y_i$ and $\Delta z_i$ and hypotenuse $\Delta r_i$. These values are represented as:

$$\Delta y_i = (l_{r_i} + l_o) \cdot \cos\Delta\Theta_i \cdot \sin\Delta\Psi_i$$

$$\Delta z_i = (l_{r_i} + l_o) \cdot \sin\Delta\Theta_i$$

$$\Delta r_i = (l_{r_i} + l_o) \cdot \sqrt{(\sin^2\Delta\Theta_i + \cos^2\Delta\Theta_i + \sin^2\Delta\Psi_i)}$$

where $l_0$ is the fixed boom length, e.g., about 36 feet, $\phi$ is the roll angle, $\Delta\Theta_i=\Theta_{r_i}-\Theta_{B_i}$, and $\Delta\Psi_i=\Psi_{r_i}-\Psi_{B_i}$. The method 100M proceeds to block B112 once the Euclidian radial distances $\Delta r_i$ have been determined for all points between the projected location of the boom tip E1 and the 3D positions of the receiver 12 within the bounding box 62 of FIG. 6, i.e., the boom tip E1 and along the boom axis $A_{18}$ as shown in FIG. 7B.

Block B112 ("Find $\Delta r_{min}$") of FIG. 3 includes determining the closest Euclidian distance $(\Delta r_{min})$ and the corresponding 3D points on the boom 18 and receiver 12. For instance, the ECU 50 may perform a calculation to determine the minimum distance within the set of all Euclidian radial distances $\Delta r_i$ determined in block B110, i.e.:

$$\Delta r_{min} = \min(\Delta r_i), i = 1, 2, ..., m, ..., N$$

where N denotes the number of 3D points on the surface of the receiver 12 within the bounding box 62 of FIG. 6, and $[\Theta_{r_m}, \Psi_{r_m}, l_{r_m}]$ and $[\Theta_B, \Psi_B, l_{r_m}]$ are the closest points. The method 100M proceeds to block B113 when $\Delta r_{min}$ has been determined by the ECU 50.

Figures 8, 9:
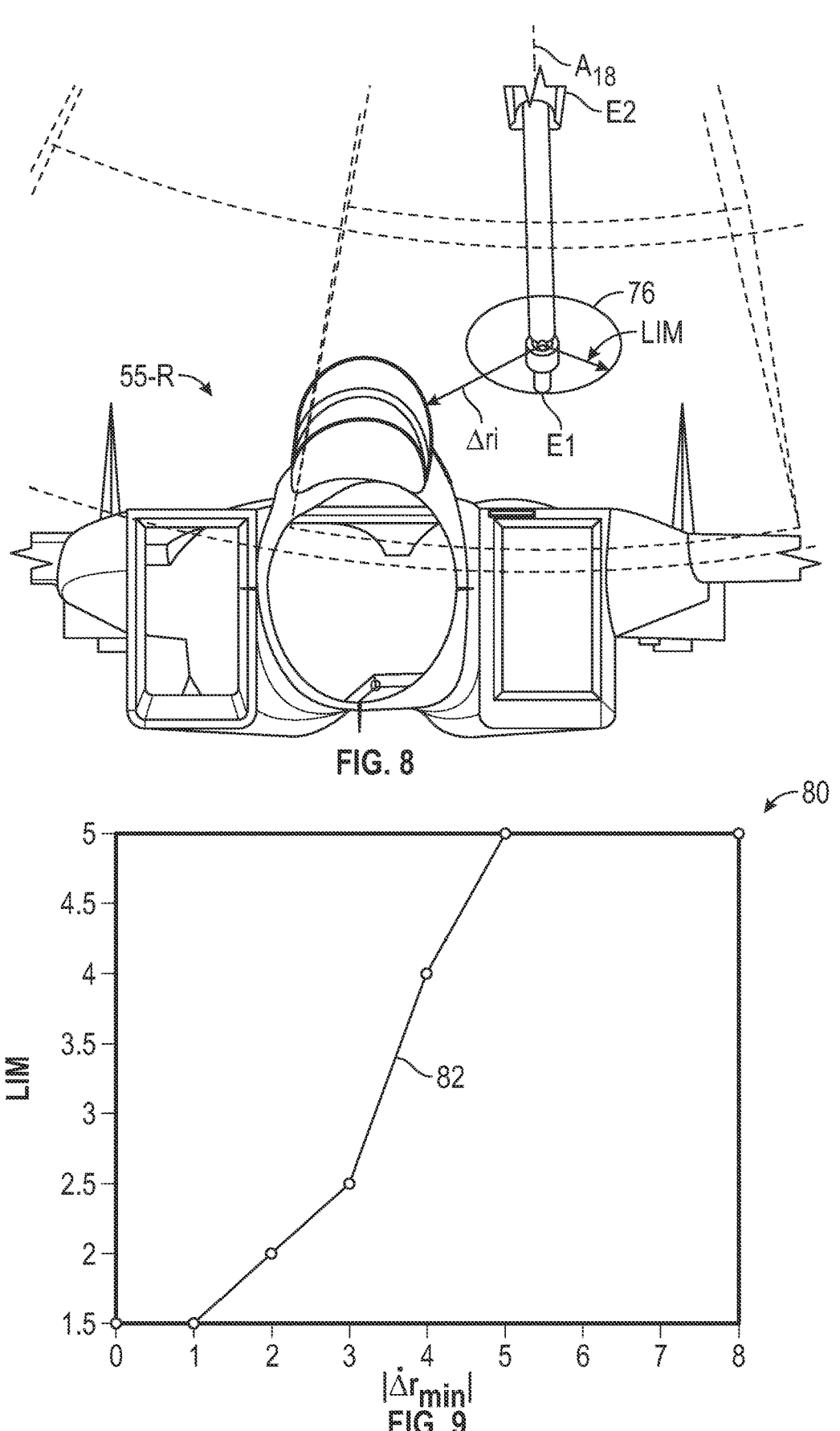
FIG. 8 is a portion of the receiver model illustrating application of a minimal distance threshold in accordance with an aspect of the disclosure.
FIG. 9 is a lookup table for determining distance thresholds based on boom closing rates, with the lookup table being usable in one or more implementations of the present method.

At block B113 ("$\Delta r_{min} \le$ LIM?") of FIG. 3, the ECU 50 shown in FIG. 1 may compare the closest Euclidian distance $\Delta r_{min}$ to a calibrated distance threshold or limit represented as "LIM" in FIG. 8. The ECU 50 thus determines whether flight control augmentation for control of the boom 18 of FIG. 1 is required. Under normal operating conditions, the ECU 50 will not intervene in existing control methodologies for flying the boom 18 into eventual engagement with the receptacle 13 during the representative A3R mission illustrated in FIG. 1. However, if the ECU 50 determines at block B113 that the closest Euclidian radial distance $\Delta_{r_{min}}$ of the set of radial distance $\Delta_{r_i}$ is less than or equal to the calibrated minimum distance, the ECU 50 may initiate an overriding flight control action, e.g., temporarily override or assist any primary flight control commands to the boom 18 to prevent a collision with the receiver 12. The method 100M of FIG. 3 returns to block B102 if the closest Euclidian radial distance $\Delta_{r_{min}}$ exceeds the calibrated distance threshold, and proceeds in the alternative to block B114 when the closest Euclidian radial distance $\Delta_{r_{min}}$ is less than or equal to this limit.

As will be appreciated by those skilled in the art, the A3R mission illustrated in FIG. 1 involves movement in three dimensions by the tanker 10, the receiver 12, and the boom 18 of FIG. 1. A3R missions are therefore dynamic, and thus the use of static comparisons in block B113 will not account for the multiple degrees of freedom of movement of the boom 18 with respect to the receiver 12. To address this possible challenge, and referring to FIG. 9, the ECU 50 of FIG. 1 may adjust the magnitude of the above-noted distance threshold in real-time based on a closure rate, $\Delta r'\_min$, of the closest Euclidian distance. Doing this will help the ECU 50 account for the response latency of the boom 18. That is, the faster the closure rate, the earlier the moving boom 18 should respond to avoid a collision with the receiver 12. In a possible implementation, the ECU 50 may access a lookup table 80 from memory 52 of FIG. 2 that is indexed or referenced by the closure rate $\Delta r'\_min$ and a minimum distance threshold (LIM) as shown. The ECU 50 may then apply the selected distance threshold, with the ECU 50 continuously adjusting the distance threshold in response to the changing closure rate $\Delta r'\_min$.

Block B114 ("Execute Control Action") entails executing a control action via the ECU 50 when the minimum distance threshold of block B112 is violated, i.e., in response to the minimum Euclidian radial distance being less than a threshold minimum distance. Suitable control actions may include automatically warning the boom operators 14 of FIG. 2, for instance by sounding an audible warning tone and/or flashing lights within the tanker 10. Such an alarm may prompt the boom operators 14 to manually fly the boom 18 away from the receiver 12, or to prompt the ECU 50 to autonomously perform an evasive maneuver to increase the distance between the boom 18 and the receiver 12. Thus, violation of the minimum distance threshold at block B113 may trigger flight control operations that change the present dynamic state of the boom 18. The method 100M of FIG. 3 may thereafter return to start and repeat operations in a loop until the A3R mission is completed.

Use of the method 100M in a receiver-specific manner is envisioned as being concurrent with position control of the boom 18 as part of the A3R mission. That is, automated pitch, roll, and telescope control of the boom 18 will remain active. Likewise, the method 100M may be suspended when breakaway maneuver control is active, i.e., when the receiver 12 rapidly breaks contact with the boom 18 via an unanticipated evasive maneuver, turbulence, or at the end of the fueling operation. As the receiver 12 is situated behind and below the tanker 10 as shown in FIG. 1, detecting a breakway maneuver of the receiver 12 may cause the ECU 50 to initiate and overriding flight control action of the boom 18. This results in the boom 18 being flown upward and away from the receiver 12 while being fully retracted along the boom axis $A_{18}$. The flight formation of FIG. 1 thus restricts the manner in which the boom 18 can move when avoiding the receiver 12, especially when the tanker 10 and receiver 12 are flying in close formation as shown in FIG. 1.

The ECU 50 of FIG. 2 programmed with resident control logic for implementing the method 100M of FIG. 3 and the described geometric segmentation strategy thus prevents the boom 18 from contacting any part of the receiver 12 during the A3R mission. By accurately predicting boundary conditions where the boom 18 and receiver 12 could possibly intersect, the ECU 50 is able to quickly augment prevailing control commands to avoid the boundary condition. Ultimately, the ECU 50 may directly or indirectly control flight of the boom 18 and its resulting trajectories relative to the receiver 12 to ensure success of the A3R mission. Compared with competing approaches such as line-of-sight steering or other computational methods, implementation of the method 100M may result in improved collision avoidance results. These and other attendant benefits of the present teaching, including reduced computational loads and expedited response times, will be readily appreciated by those skilled in the art having the benefit of the present disclosure.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The following Clauses provide example configurations of systems and methods for guiding the refueling boom 18 of FIG. 1 during an A3R mission in accordance with the disclosure.

Clause 1: A boom guidance system for use during an automated air-to-air refueling (A3R) mission, the boom guidance comprising: a plurality of sensors configured to output sensor data indicative of a three-dimensional (3D) position of a fuel-receiving aircraft (receiver) and a refueling boom of a fuel-supplying aircraft (tanker) in a receiver reference frame and a boom reference frame, respectively; and an electronic control unit ("ECU") in communication with the plurality of sensors, wherein the ECU is programmed to: read a 3D model of the receiver from memory of the ECU; receive the sensor data, including a position of the receiver in the receiver reference frame and a pitch, roll, and telescope length of the boom in the boom reference frame; map a set of points in the receiver reference frame to the boom reference frame as mapped points using the 3D model of the receiver and a linear model of the boom; compute Euclidian radial distances between each of the mapped points and each respective point on the boom; determine a minimum Euclidian radial distance in the set of Euclidian distances; and execute a flight control operation of the boom during the A3R mission in response to the minimum Euclidian radial distance being less than a threshold minimum distance.

Clause 2: The boom guidance system of clause 1, wherein the memory of the ECU includes a library of different receiver models, and wherein the ECU is programmed to identify the receiver prior to or during an automated air-to-air refueling (A3R) mission, and thereafter select the 3D model of the receiver from the library based on an identity of the receiver.

Clause 3: The boom guidance system of clauses 1 or 2, wherein the sensors include a rearward-facing camera configured to output real-time image data as part of the sensor data, and wherein the ECU is configured to identify the receiver during the A3R mission by recognizing the receiver in the real-time image data.

Clause 4: The boom guidance system of any of clauses 1-3, wherein the ECU is programmed to create a bounding box around a current position of the boom, a volume of the bounding box being based on a predetermined speed of movement of the boom, and to compute the Euclidian radial distances only for points located within the volume of the bounding box.

Clause 5: The boom guidance system of any of clauses 1-5, wherein the ECU is programmed to determine a closure rate of the boom to the receiver, and to selectively adjust the threshold minimum distance in real-time based on the closure rate.

Clause 6: The boom guidance system of clause 5, wherein the ECU is programmed with a lookup table indexed by the threshold minimum distance and the closure rate, and to select the threshold minimum distance from the lookup table using the closure rate.

Clause 7: The boom guidance system of any of clauses 1-6, wherein the ECU is programmed to execute the flight control operation of the boom by transmitting flight control signals to one or more flight control surfaces on the refueling boom to thereby cause the boom to increase the minimum Euclidian radial distance until the minimum Euclidian distance exceeds the threshold minimum distance.

Clause 8: The boom guidance system of any of clauses 1-7, wherein the ECU is programmed to initiate an overriding flight control action in response to detection of a breakaway maneuver of the receiver.

Clause 9: A method comprising for controlling an automated air-to-air refueling (A3R) mission, comprising: reading a 3D model of a fuel-receiving aircraft (receiver) from memory of an electronic control unit (ECU); receiving sensor data from a plurality of sensors via the ECU, the sensor data being indicative of a three-dimensional (3D) position of the receiver and a refueling boom of a fuel-supplying aircraft (tanker) in a receiver reference frame and a boom reference frame, respectively, the sensor data including pitch, roll, and telescope length of the boom in the boom reference frame; mapping a set of points in the receiver reference frame to the boom reference frame as mapped points using the 3D model of the receiver and a linear model of the boom; computing Euclidian radial distances between each of the mapped points and each respective point on the boom; determining a minimum Euclidian radial distance in the set of Euclidian distances; and executing a flight control operation of the boom via the ECU in response to the minimum Euclidian radial distance being less than a threshold minimum distance.

Clause 10: The method of clause 9, further comprising: determining an identity of the receiver via the ECU; and selecting the 3D model of the receiver, from a library stored in memory of the ECU, based on the identity of the receiver.

Clause 11: The method of clause 9 or 10, further comprising: determining the identity of the receiver in real-time during the A3R mission by recognizing the receiver in real-time image data from one or more of the sensor, via the ECU, wherein the sensor data includes the real-time image data.

Clause 12: The method of any of clauses 9-11, further comprising: creating a bounding box around a current position of the boom via the ECU, wherein a volume of the bounding box is based on a predetermined speed of movement of the boom; and computing the Euclidian radial distances only for points located within the volume of the bounding box.

Clause 13: The method of any of claims 9-12, further comprising: determining a closure rate of the boom to the receiver via the ECU; and selectively adjusting the threshold minimum distance in real-time based on the closure rate.

Clause 14: The method of clause 13, further comprising: selecting the threshold minimum distance from a lookup table via the ECU using the closure rate of the boom.

Clause 15: The method of any of clauses 9-14, further comprising: executing the flight control operation of the boom by transmitting flight control signals to one or more flight control surfaces on the refueling boom, the flight control signals causing the boom to increase the minimum Euclidian radial distance until the minimum Euclidian distance exceeds the threshold minimum distance.

Clause 16: The method of any of clauses 9-15, further comprising: detecting a breakaway maneuver of the receiver via the ECU; and initiating an overriding flight control action in response to detection of a breakaway maneuver of the receiver.

Clause 17: A tanker comprising: a fuselage configured to transport aviation fuel; a refueling boom connected to the fuselage; and a boom guidance system during an automated air-to-air refueling (A3R) mission, the boom guidance comprising: a plurality of sensors configured to output sensor data indicative of a three-dimensional ("3D") position of a fuel-receiving aircraft ("receiver") and a refueling boom of a fuel-supplying aircraft ("tanker") in a receiver reference frame and a boom reference frame, respectively; and an electronic control unit ("ECU") in communication with the plurality of sensors, wherein the ECU is programmed to: read a 3D model of the receiver from memory of the ECU; receive the sensor data, including a position of the receiver in the receiver reference frame and a pitch, roll, and telescope length of the boom in the boom reference frame; map a set of points in the receiver reference frame to the boom reference frame as mapped points using the 3D model of the receiver and a linear model of the boom; compute Euclidian radial distances between each of the mapped points and each respective point on the boom; determine a minimum Euclidian radial distance in the set of Euclidian distances; and execute a flight control operation of the boom during the A3R mission in response to the minimum Euclidian radial distance being less than a threshold minimum distance.

Clause 18: The tanker of clause 17, wherein the ECU is programmed to create a bounding box around a current position of the boom, a volume of the bounding box being based on a predetermined speed of movement of the boom, and to compute the Euclidian radial distances only for points located within the volume of the bounding box.

Clause 19: The tanker of either of clauses 17 or 18, wherein the ECU is programmed to determine a closure rate of the boom to the receiver, and to selectively adjust the threshold minimum distance in real-time based on the closure rate.

Clause 20: The tanker of any of clauses 17-19, wherein the ECU is programmed to execute the flight control operation of the boom by transmitting flight control signals to one or more flight control surfaces on the refueling boom, and to thereby increase the minimum Euclidian radial distance until the minimum Euclidian distance exceeds the threshold minimum distance.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A boom guidance system for use during an automated air-to-air refueling (A3R) mission, the boom guidance system comprising:
a plurality of sensors configured to output sensor data indicative of a three-dimensional (3D) position of a fuel-receiving aircraft (receiver) and a boom of a fuel-supplying aircraft (tanker) in a receiver reference frame and a boom reference frame, respectively; and
an electronic control unit (ECU) in communication with the plurality of sensors, wherein the ECU is programmed to:
read a 3D model of the receiver from memory of the ECU;
receive the sensor data, including a position of the receiver in the receiver reference frame and a pitch, roll, and telescope length of the boom in the boom reference frame;
map a set of points in the receiver reference frame to the boom reference frame as mapped points using the 3D model of the receiver and a linear model of the boom;
create a bounding box that encompasses at least a boom tip and a boom pivot;
compute a set of Euclidian radial distances between each of the mapped points and each respective point on the boom located within the bounding box;
determine a minimum Euclidian radial distance in the set of Euclidian distances; and
execute a flight control operation of the boom during the A3R mission in response to the minimum Euclidian radial distance being less than a threshold minimum distance.

2. The boom guidance system of claim 1, wherein the memory of the ECU includes a library of different receiver models, and wherein the ECU is programmed to identify the receiver prior to or during the A3R mission, and thereafter select the 3D model of the receiver from the library based on an identity of the receiver.

3. The boom guidance system of claim 2, wherein the plurality of sensors includes a rearward-facing camera configured to output real-time image data as part of the sensor data, and wherein the ECU is configured to identify the receiver during the A3R mission by recognizing the receiver in the real-time image data.

4. The boom guidance system of claim 1, wherein the ECU is programmed to determine a closure rate of the boom to the receiver, and to selectively adjust the threshold minimum distance in real-time based on the closure rate.

5. The boom guidance system of claim 4, wherein the ECU is programmed with a lookup table indexed by the threshold minimum distance and the closure rate, and to select the threshold minimum distance from the lookup table using the closure rate.

6. The boom guidance system of claim 1, wherein the ECU is programmed to execute the flight control operation of the boom by transmitting flight control signals to one or more flight control surfaces on the boom to thereby cause the boom to increase the minimum Euclidian radial distance until the minimum Euclidian distance exceeds the threshold minimum distance.

7. The boom guidance system of claim 1, wherein the ECU is programmed to initiate an overriding flight control action in response to detection of a breakaway maneuver of the receiver.

8. The boom guidance system of claim 1, wherein a current position of the boom is determined in real-time via the sensor data.

9. A method for controlling an automated air-to-air refueling (A3R) mission, comprising:
reading a 3D model of a fuel-receiving aircraft (receiver) from memory of an electronic control unit (ECU);
receiving sensor data from a plurality of sensors via the ECU, the sensor data being indicative of a three-dimensional (3D) position of the receiver and a position of a boom of a fuel-supplying aircraft (tanker) in a receiver reference frame and a boom reference frame, respectively, the sensor data including pitch, roll, and telescope length of the boom in the boom reference frame,
mapping a set of points in the receiver reference frame to the boom reference frame as mapped points using the 3D model of the receiver and a linear model of the boom;
creating a bounding box that encompasses at least a boom tip and a boom pivot;
computing a set of Euclidian radial distances between each of the mapped points and each respective point on the boom located within the bounding box;
determining a minimum Euclidian radial distance in the set of Euclidian distances; and
executing a flight control operation of the boom via the ECU in response to the minimum Euclidian radial distance being less than a threshold minimum distance.

10. The method of claim 9, further comprising:
determining an identity of the receiver via the ECU; and
selecting the 3D model of the receiver, from a library stored in memory of the ECU, based on the identity of the receiver.

11. The method of claim 10, further comprising:
determining the identity of the receiver in real-time during the A3R mission by recognizing the receiver in real-time image data from one or more of the plurality of sensors, via the ECU, wherein the sensor data includes the real-time image data.

12. The method of claim 9, further comprising:
determining a closure rate of the boom to the receiver via the ECU; and
selectively adjusting the threshold minimum distance in real-time based on the closure rate.

13. The method of claim 12, further comprising:

selecting the threshold minimum distance from a lookup table via the ECU using the closure rate of the boom.

14. The method of claim 9, further comprising:

executing the flight control operation of the boom by transmitting flight control signals to one or more flight control surfaces on the boom, the flight control signals causing the boom to increase the minimum Euclidian radial distance until the minimum Euclidian distance exceeds the threshold minimum distance.

15. The method of claim 9, further comprising:

detecting a breakaway maneuver of the receiver via the ECU; and initiating an overriding flight control action in response to detection of a breakaway maneuver of the receiver.

16. The method of claim 9, wherein a current position of the boom is determined in real-time via the sensor data.

17. A tanker comprising:

a fuselage configured to transport aviation fuel;

a boom connected to the fuselage; and a boom guidance system for use during an automated air-to-air refueling (A3R) mission, the boom guidance system comprising:

a plurality of sensors configured to output sensor data indicative of a three-dimensional (3D) position of a fuel-receiving aircraft (receiver) and the boom in a receiver reference frame and a boom reference frame, respectively; and an electronic control unit (ECU) in communication with the plurality of sensors, wherein the ECU is programmed to:

read a 3D model of the receiver from memory of the ECU;

receive the sensor data, including a position of the receiver in the receiver reference frame and a pitch, roll, and telescope length of the boom in the boom reference frame;

map a set of points in the receiver reference frame to the boom reference frame as mapped points using the 3D model of the receiver and a linear model of the boom;

create a bounding box that encompasses at least a boom tip and a boom pivot;

compute a set of Euclidian radial distances between each of the mapped points and each respective point on the boom located within the bounding box;

determine a minimum Euclidian radial distance in the set of Euclidian distances; and execute a flight control operation of the boom during the A3R mission in response to the minimum Euclidian radial distance being less than a threshold minimum distance.

18. The tanker of claim 17, wherein the ECU is programmed to determine a closure rate of the boom to the receiver, and to selectively adjust the threshold minimum distance in real-time based on the closure rate.

19. The tanker of claim 17, wherein the ECU is programmed to execute the flight control operation of the boom by transmitting flight control signals to one or more flight control surfaces on the boom, and to thereby increase the minimum Euclidian radial distance until the minimum Euclidian distance exceeds the threshold minimum distance.

20. The tanker of claim 17, wherein a current position of the boom is determined in real-time via the sensor data.

\* \* \* \* \*